United States Patent
Joyard et al.

[11] 3,760,652
[45] Sept. 25, 1973

[54] INDEXING ARRANGEMENT

[75] Inventors: Maurice L. Joyard, Rioz; Jean Latapie, Tarbes, both of France

[73] Assignee: Etat Francais, Paris, France

[22] Filed: Jan. 18, 1972

[21] Appl. No.: 218,674

[30] Foreign Application Priority Data
  Jan. 18, 1971  France .............................. 7101519

[52] U.S. Cl. ................. 74/527, 74/813 L, 269/48.1
[51] Int. Cl. .............................................. G05g 5/06
[58] Field of Search ................. 74/527, 817 L, 813; 269/48.1

[56] References Cited
UNITED STATES PATENTS

| | | | |
|---|---|---|---|
| 2,476,195 | 7/1949 | Horman | 74/527 |
| 914,743 | 3/1909 | McDonald | 269/48.1 |
| 2,446,281 | 8/1948 | Harding | 269/48.1 |
| 1,166,284 | 12/1915 | Vroman | 269/48.1 |
| 2,731,851 | 1/1956 | Calo | 74/527 |
| 2,936,652 | 5/1960 | Gunzner | 74/527 |
| 2,978,814 | 4/1961 | Burhans | 74/813 |
| 3,030,903 | 4/1962 | Morris | 269/48.1 |

*Primary Examiner*—Charles J. Myhre
*Assistant Examiner*—Wesley S. Ratliff, Jr.

[57] ABSTRACT

An indexing arrangement for repetitive, accurate positioning of a movable part relative to a fixed one which comprises a cylindrical cavity in the fixed part, terminating at the intended plane of movement at least one cylindrical cavity in the movable part also terminating at said plane and having a diameter as near equal to that of the diameter of the cavity of the fixed part as is possible and a cylindrical pin able to slide with clearance in the cavity of the fixed part. The pin is projected into the cavity of the movable part and is then expanded radially accurately to align the two parts.

7 Claims, 14 Drawing Figures

INDEXING ARRANGEMENT

This invention relates to an indexing scheme which may be carried out economically and allows accurate, swift and repetitive positioning of two parts with respect to each other, one of these parts being able to move by sliding upon the other (either in translation or rotation, or as a combination of those two motions). This arrangement, which comprises a radially expansible pin, is particularly applicable to tables, turrets, carriages, machine-tool bed-plates (milling machines, reaming machines, tapering machines, etc.) performing numerous cycles of precision machining.

To date, diverse machine tools are equipped with mechanisms allowing rapid and repetitive angular positioning (indexing) of pivoting components such as tables or circular plates with respect to a support table. Known mechanisms of this kind do not allow accurate positioning. Generally, they comprise a conically cylindrical bolt sliding in a cylindrical cavity located in the support table, the bolt's end engaging one of the conical bosses provided on the pivoting component. It is easy to see that indexing accuracy depends on the inevitable play between the cylindrical sliding surfaces. In operation, this play can only increase because of wear due to friction and impacts.

Therefore the contemporary accuracy generally warrantied by the builder is confined to a value between 0.01 mm and 0.02 mm.

The arrangement which is the object of the invention is characterized by the following advantages:
  indexing precision up to 3 microns
  virtual elimination of wear due to friction and of danger of binding
  the accurate machining of indexing pin cavities is much facilitated by their being made up of cylindrical bores
  the maximum transverse force applicable to the cylindrical pin (parallel to the sliding plane) may reach a relatively high value without jeopardizing the indexing precision.

In its overall conception, the indexing arrangement allows precise, rapid and repetitive positioning of a movable part with respect to a fixed part, the movable one being able to move on the fixed one according to a definite scheme (the displacement may be translation, or a rotation, or a combination of both). The arrangement comprises:

a. a cylindrical housing or cavity located in the fixed part, perpendicular to the plane of sliding and ending at it;

b. one or several cylindrical cavities located in the movable part and with diameters as close as possible to that of the fixed part, perpendicular to the plane of sliding and ending on it; and c. a cylindrical pin able to slide with some play into the cavity of the fixed part, comprising:
    a means for being inserted into one of the movable part cavities when the latter is approximately lined up with the fixed part cavity; and
    a means for radially expanding this pin such that the axes of the internal cylindrical surfaces of the movable part cavity on one hand, and those of the fixed part cavity on the other, are perfectly aligned by this radial expansion.

The characteristics and advantages of this invention shall be described below and illustrated by means of the attached drawings wherein:

FIG. 10 shows a detailed view in axial section of the indexing arrangement shown diagrammatically in FIG. 4, of which FIG. 10 illustrates one mode of execution; the cylindrical pin will not be inserted into the movable part cavity which is shown slightly shifted with respect to the fixed part cavity;

Figure 1:
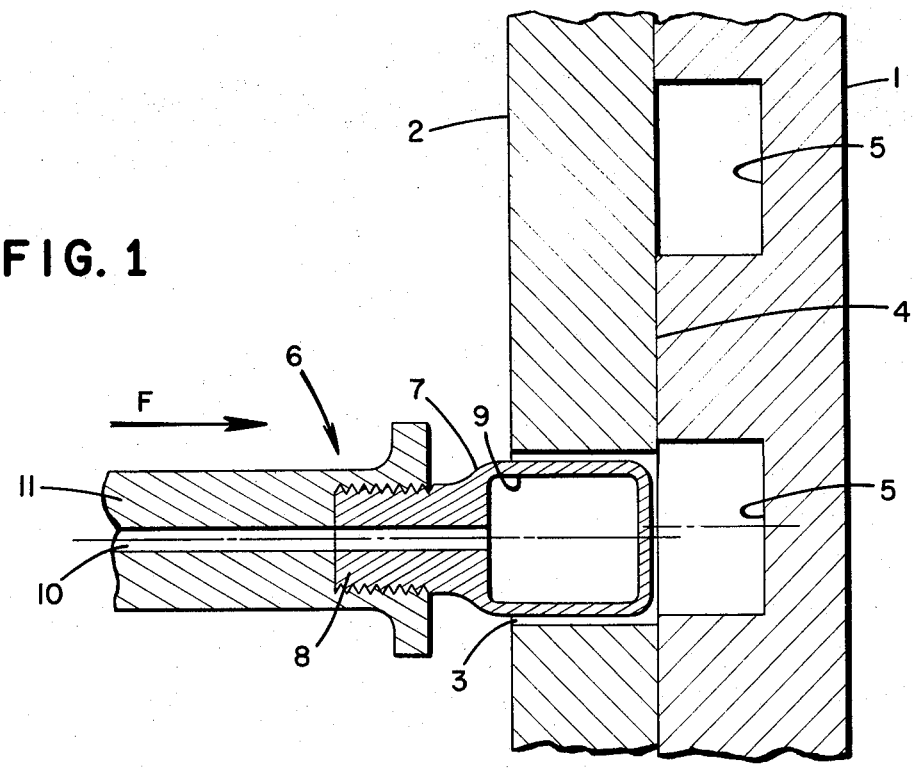
FIG. 1 is a schematic view along an axial section of an indexing arrangement according to the invention in which a cylindrical pin, which has an elastic envelope filled with a non-pressurized fluid, fits with radial play in the cavity of the fixed part but is not inserted into the cavity of the movable part which, as shown, is slightly shifted with respect to the cavity of the fixed part.
Figure 2:
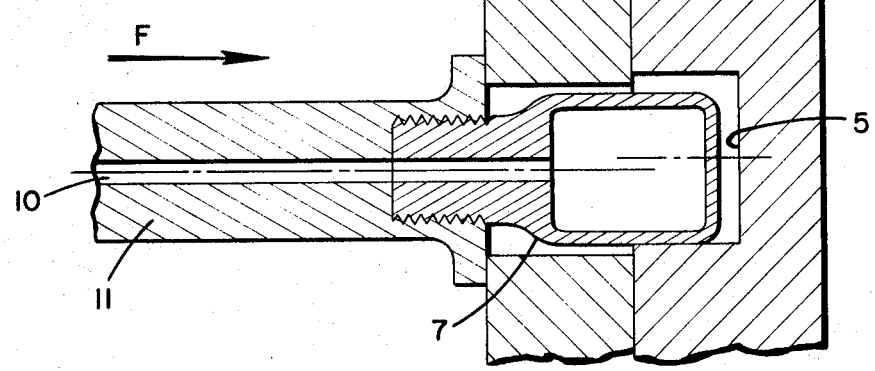
FIG. 2 is similar to FIG. 1, but it shows the pin (still under no pressure) inserted with radial play into the cavity of the movable part.
Figure 3:
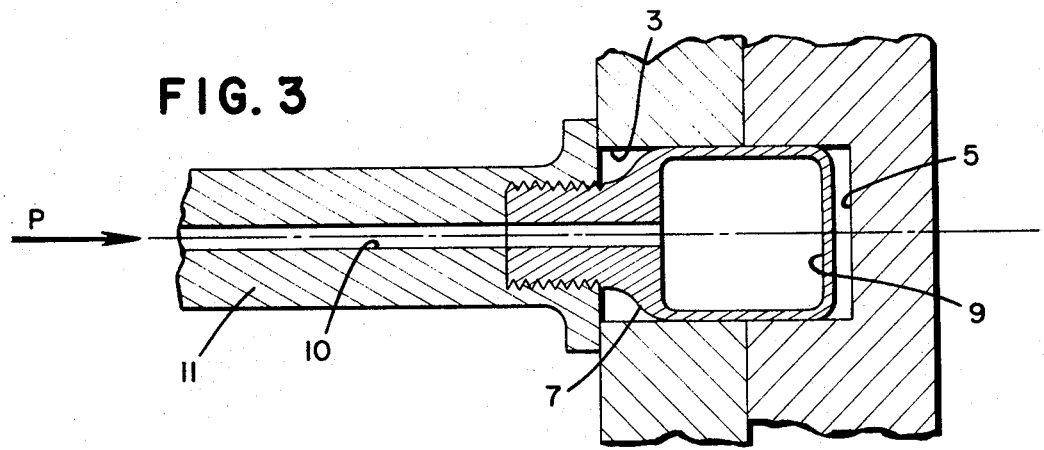
FIG. 3 is similar to FIG. 2, but it shows the pin subjected to the pressure from an internal fluid causing its dilation, by which the radial play has been eliminated, and the axes of the cavity of the movable part is exactly aligned with that of the fixed part.

FIGS. 1, 2, 3 shown in schematic form the principle of a particular embodiment of the indexing arrangement according to the general concept as developed in paragraphs a), b), c) above.

The cylindrical pin 6 is provided with an elastic tubular envelope of only slight thickness and inside of which has been devised the hermetic chamber 9. The tubular envelope 7 is provided with a threaded bottom 8 which allows fixing the pin on the insertion means 11; the latter may be either a hydraulic or pneumatic jack, or any other device allowing the accomplishment of an axial displacement in the direction of arrow F. The radial expansion of the pin is achieved by the fluid pressure P from a generator connected to chamber 9 via conduit 10. As an embodiment of the invention, envelope 7 may be characterized as follows:

material: steel AFNOR 35 NCD 16h (under AFNOR classification defined by the French standards NFA 02–001), hardened, drawn at 500° C
OD: 20 mm
thickness: 0.3 mm
play between free envelope (no pressure) and the cavities: 0.05 mm
pressure required for radial expansion: 160–200 bars.

FIGS. 1, 2, 3 show the three principal stages of the indexing sequence:

FIG. 1: cavity 5 is approximately lined up with cavity 3.
FIG. 2: insertion means 11 and pin 6 did move in direction of arrow F (there is play between the outer diameter of envelope 7 and the diameters of the cavities); envelope 7 has entered cavity 5.
FIG. 3: pressure P is applied to chamber 9 so that envelope 7 rapidly dilates and so that the internal cylindrical surfaces of cavities 3 and 5 line up perfectly.

Figure 4:
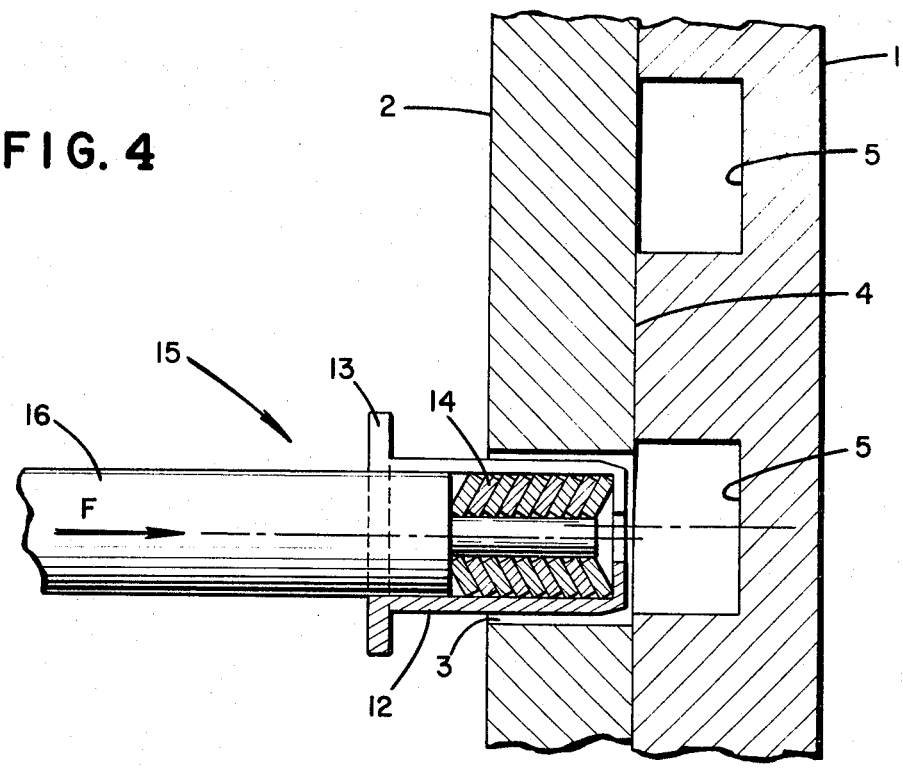
FIGS. 4, 5, 6 are respectively similar to FIGS. 1, 2, 3 but they show diagrammatically a different means for obtaining the pin's radial expansion; this means comprises a stack of elastic washers which, when axially compressed, will dilate radially (FIG. 6)
Figure 5:
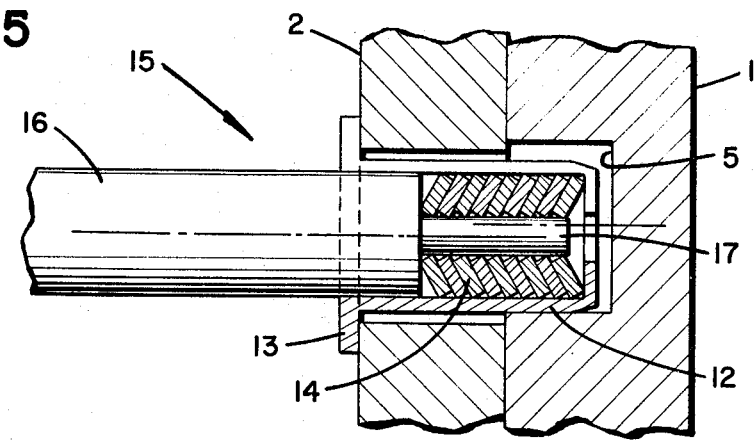
Figure 6:
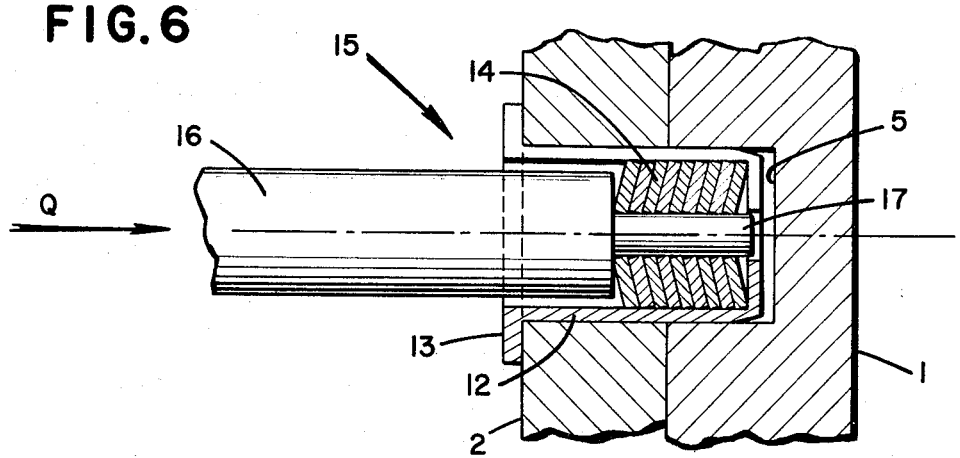
Figure 7:
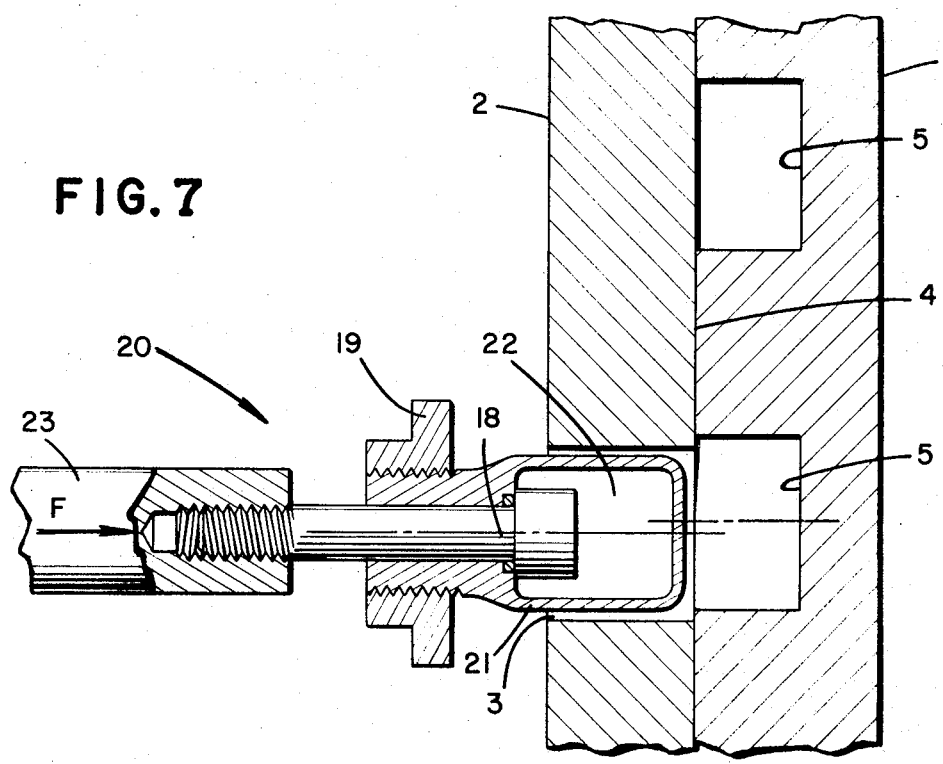
FIGS. 7, 8, 9 are respectively similar to FIGS. 1, 2, 3 and 4, 5, 6, but they show diagrammatically a different means for obtaining the pin's radial expansion; this means comprises an elastic envelope filled with an elastomer; when actuated by axial compression, a piston may penetrate this envelope (FIG. 9)
Figure 8:
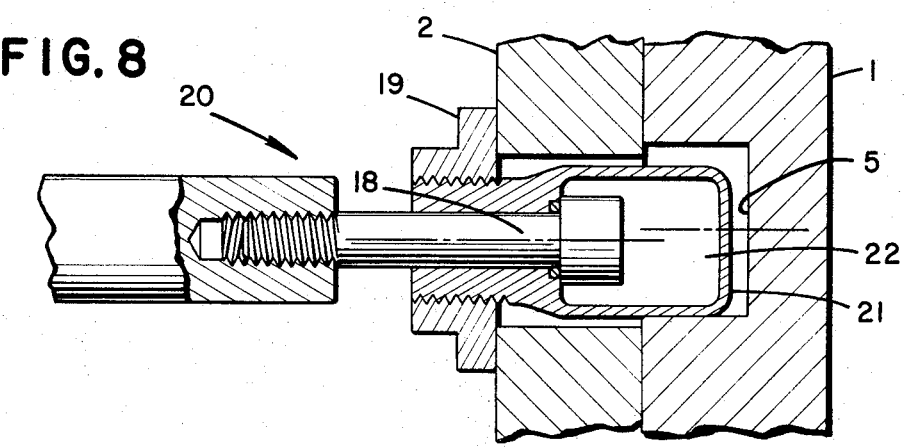
Figure 9:
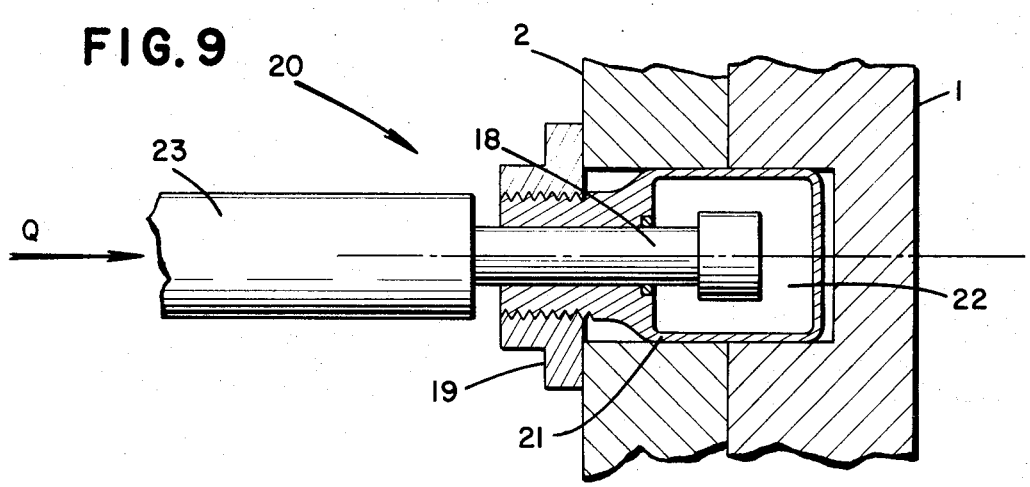

FIGS. 4, 5, 6 on one hand, and FIGS. 7, 8, 9 on the other, diagrammatically illustrate two other principles of realization in accordance with the general concept previously developed in paragraphs a), b), c). In both embodiments, cylindrical pin 15 or 20 is provided with a section capable of rapidly dilating under the influence of axial compression exerted by a thrust mechanism 16 or 23. The latter also acts as an insertion means for the pin into each of the cavities 5 of the movable part 1, and it may be either a hydraulic or pneumatic jack or any other device making possible an axial displacement and an exertion Q in the direction of arrow F.

In order to reduce bulkiness and the cost of the thrust mechanism, it is desirable that the pin be so conceived that a minimal axial compression be translated into an appreciable radial pressure exerted upon the pin in its cavities.

1/— In the principle of the embodiment shown in FIGS. 4, 5, 6, pin 15 comprises the expansible, tubular sleeve 12 holding a stack of elastic washers 14 centered on the stem 17 which is fixed to the thrust mechanisms 16; the elastic washers are characterized by radially dilating while exerting significant radial pressure upon sleeve 12 when under slight axial compression Q from the thrust mechanism 16 (FIG. 6); flange 13 of sleeve 12 then is supported by fixed part 2. A detailed description of the two arrangements realized in accordance with this principle will be found further below.

2/— In the principle of the embodiment shown in FIGS. 7, 8, 9, pin 20 is provided with a thin tubular envelope 21 which is an hermetic chamber 22 containing an elastomer. Plunging piston 18 is fixed to thrust mechanism 23 and enters chamber 22 under the effect of axial compression Q, whereby envelope 21 swells radially (FIG. 9) and hoop 19 then being supported by fixed part 2. As an illustration of execution, envelope 21 may be characterized by material, OD, thickness, play with respect to cavities, the same as previously defined for envelope 7. If in such conditions one uses a diameter of 12 mm for piston 18, then mechanism 23 must exert an axial compression of the order of 230 daN if the pin's radial expansion is to take place.

Figure 11:
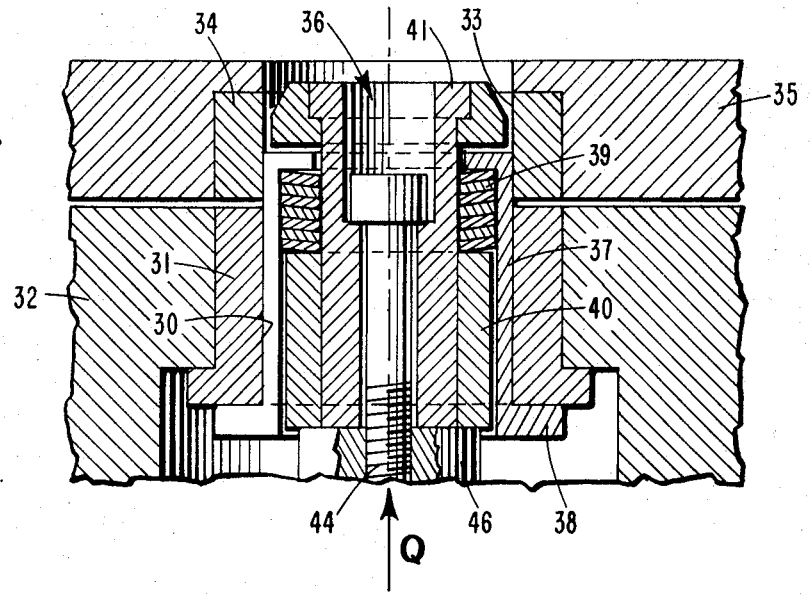
FIG. 11 shows a fragmentary view of the arrangement of FIG. 1; it shows the cylindrical pin inserted into the movable part cavity and radially dilated, the axis of the movable part cavity being exactly aligned with that of the fixed part.
Figure 10:
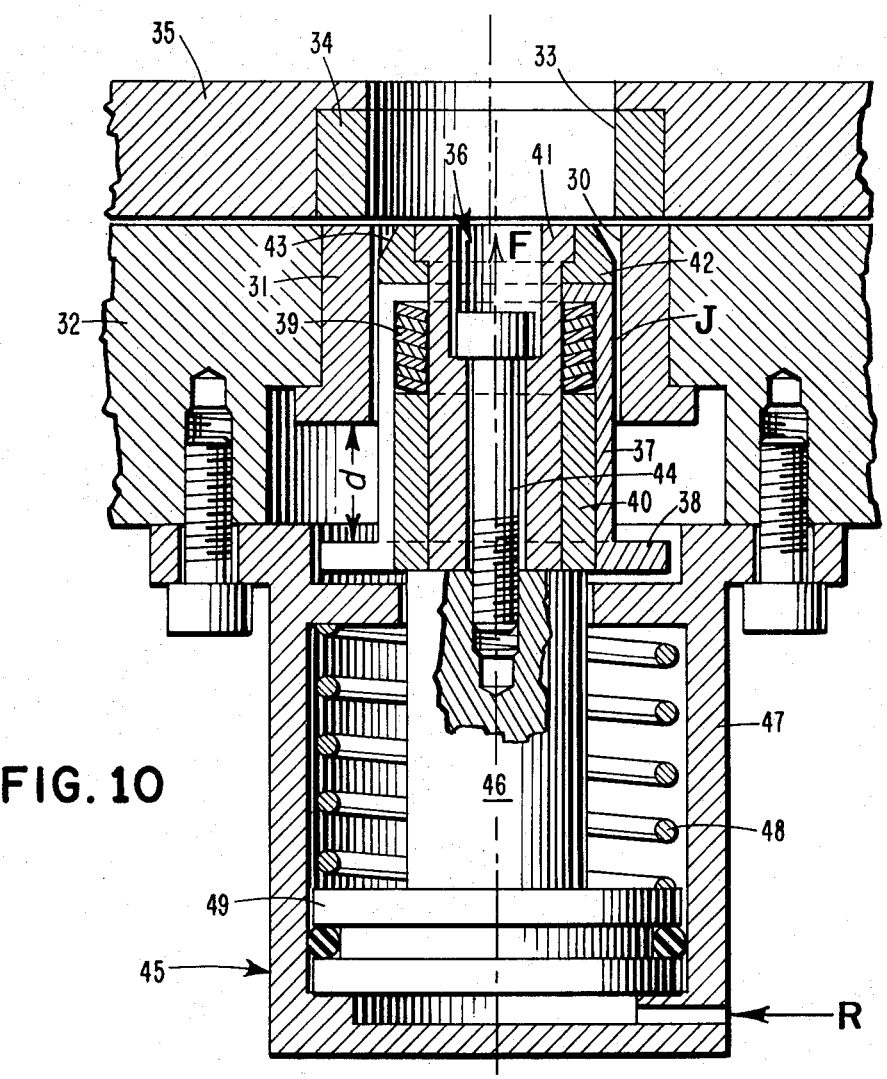

The drawings following FIGS. 10 and 11 show, as an illustrative example, a first construction mode in accordance with the arrangement according to paragraph 1/— above.

As shown, the arrangement comprises:

a/— a cylindrical boring 30 effected in shouldered cylindrical ring 31 of hardened steel, press-fitted into fixed part 32.

b/— a cylindrical boring 33 effected in the hardened steel ring 34 which is press-fitted into the movable part 35.

In order to ensure indexing precision, the finish by trueing of borings 30 and 33 is carried out on both rings 31 and 34 respectively fastened on parts 32 and 35. In an empirical arrangement done for the purpose of positioning a bedplate capable of pivoting around an axis with respect to a fixed supporting table, each cavity 33 of this bedplate is shifted from the cavity 30 of the table an amount between 0 and 0.025 mm from diameter to diameter, an amount which is not prejudicial to positioning accuracy since the indexing error measured at the level of the pin axis (this axis being 175 mm away from the pivot axis) remains within three microns.

c/— the tubular pin 36 made up of:

The expansible tubular sleeve 37 slit along a generatrix and provided with flange 38 which is to be supported on the shouldered ring 31 when pin 36 has entered cavity 33 and has reached the position shown in FIG. 11. In view of the construction, the OD of sleeve 37 offers a play J between 0.05 mm and 0.1 mm with borings 30 and 33.

a stack of twelve commercial elastic washers 39, made of special spring steel, in the shape of frustrums of cones alternately provided with slots on the outer and inner diameters; when without constraints, the washers' OD is trued so as to offer a play of the order of 0.02 mm with the ID of sleeve 37; the ID is 11 mm and the thickness is 0.5 mm; the cone angle is 9° with respect to the plane normal to the axis; as to loading, these washers are used in conformity with the manufacturer's instructions.

ring 40 serving as compression ring for washers 39
sleeve 41 meant to support and to center the washers 39, ring 50, sleeve 37 and hoop 42.
hoop 42, provided with insertion cone 43.
screw 44 allowing fastening pin 36 on stem 46 of jack 45.

d/— a single-acting commercial jack 45, supplied with compressed air at low pressure as shown by arrow R and comprising a hydraulic pressure multiplying system (for the sake of simplicity FIG. 10 only shows a classical, single-acting jack). Supplied with 6 bars compressed air, the jack delivers an exertion Q of 600 daN.

The jack's body 47 is fastened by screw onto the fixed part 32; spring 48 ensures the return of all of piston 49, stem 46, pin 36 to the position shown in FIG. 10 when the supply pressure is eliminated.

Operation is as follows:

1/— One obtains an initial approximate position of the moving part 35 with respect to the fixed part 32 so that cavity 33 be centered within ± 1 mm with respect to cavity 30 (configuration of FIG. 10).

2/— compressed air pressure is applied to jack 45, pin 36 then enters cavity 33 (entry is facilitated by entry cone 43 of hoop 42) until flange 38 of sleeve 37 touches ring 31. The movable ensemble then has been displaced from the travel d and sleeve 37, when entering cavity 33, positioned the latter to within ± J mm with respect to cavity 30 (in view of the construction, J is kept to within 0.05 mm and 0.1 mm). Air pressure being maintained, jack stem 46 exerts a force Q on ring 40 and on elastic washers 39, so that the latter dilate radially as well as the expansible sleeve 37, thereby achieving perfect centering of cavity 33 with respect to cavity 30 and with an indexing precision of up to 3 microns.

In the empirical arrangements already reduced to practice, the maximum force applicable to the movable part 35 in the direction parallel to the plane of sliding may reach 20 to 30 kN without prejudice to indexing precision.

Figure 12:
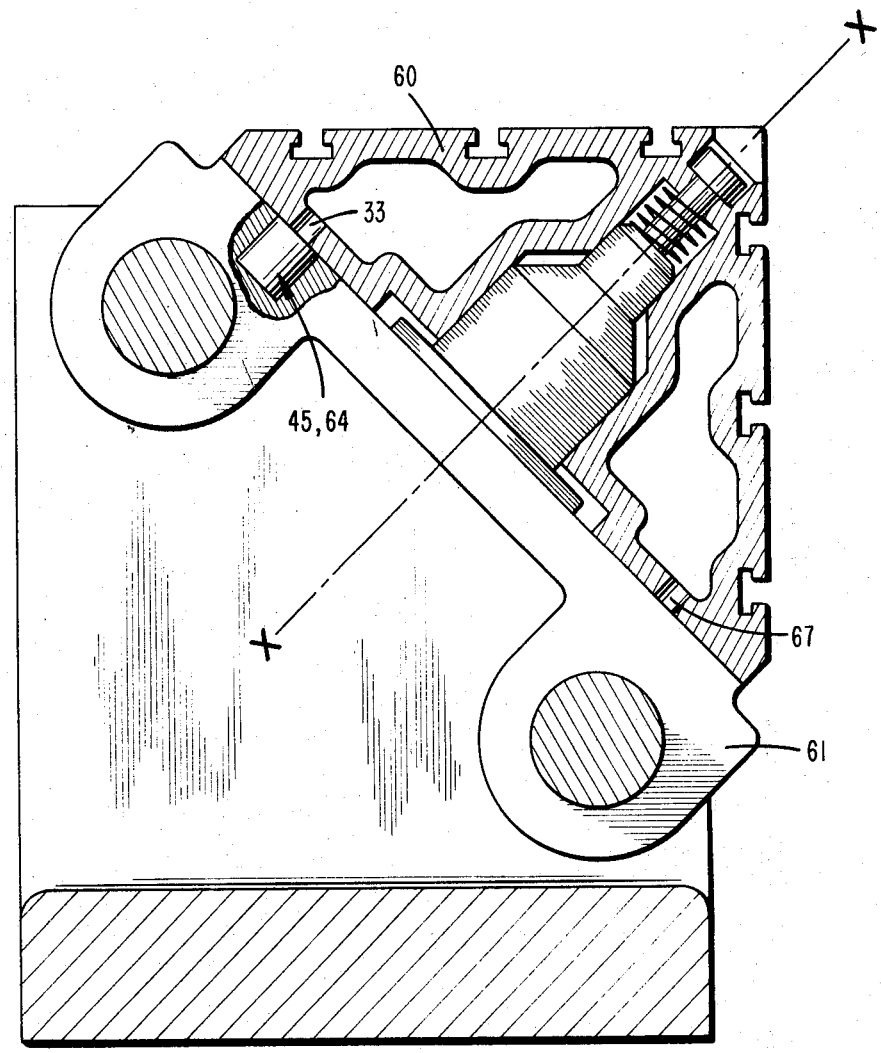
FIG. 12 shows a view in axial section of a pivotable table supported by the movable transverse table of a machine tool; the figure shows in simplified form the layout of the indexing arrangement allowing to position the pivotable table.
Figure 14:
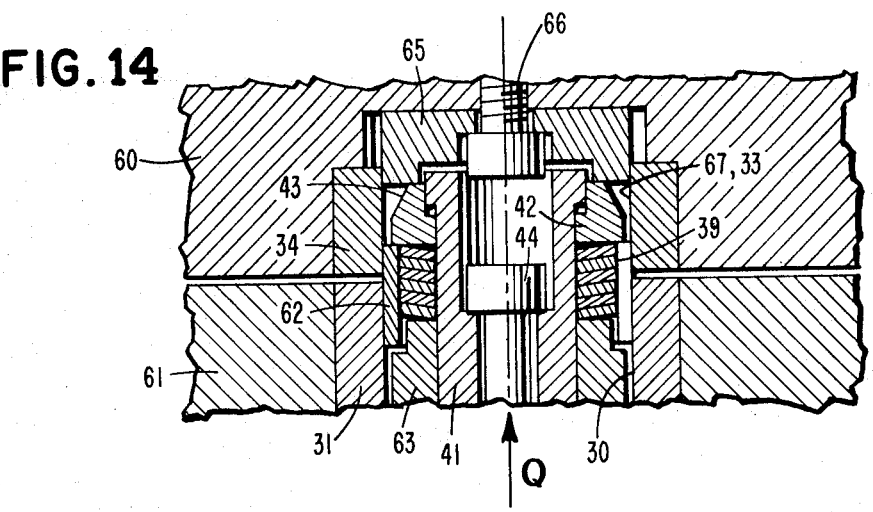
FIG. 14 shows a fragmentary view of the arrangement of FIG. 13; it shows the cylindrical pin inserted into the movable part cavity and radially dilated, the axis of the movable part cavity being exactly aligned with that of the fixed part.
Figure 13:
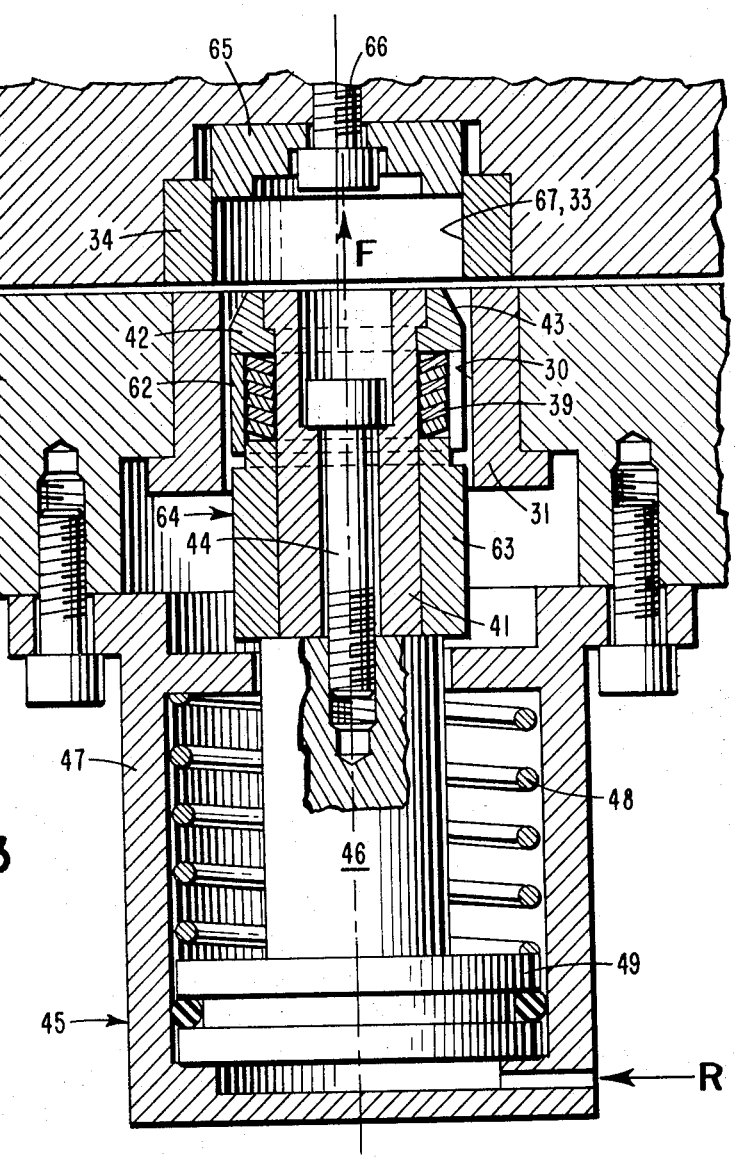
FIG. 13 shows a detailed view in axial section of the indexing arrangement mounted on the pivotable table of FIG. 12; it illustrates further a slightly different conception from that in FIG. 10; the pin is shown not inserted into the movable part cavity which is slightly shifted with respect to that of the fixed part.

FIGS. 13 and 14 show a second mode of construction of a prototype arrangement according to a slightly different concept from the first arrangement described above. This second arrangement is mounted on a machine tool as shown in the diagram of FIG. 12. It allows accurate, rapid and repetitive positioning of the pivotable table 60 pivoting around the axis XX with respect to the transversally movable supporting table 61.

The two cavities 33 and 67 located on the pivotable table 60 allow indexing of the latter according to two positions 180° apart.

This second arrangement differs from the first in the following aspects:

the expansible sleeve 62 is a simple, thin tube slotted along a generatrix.

a stop 65 is fastened by screw 66 at the bottom of the two cavities 33 and 67 and supports the collet 42 of pin 64 at the end of the latter's entry into cavity 33 or 67 (configuration of FIG. 14); therefore the thrust Q tends to separate the pivotable table 60 from the support table 61, and this may be detrimental to indexing accuracy. This drawback is absent from the first arrangement.

The indexing arrangement described above as an illustrative example may be applied when one wishes to secure the best conditions in regard to speed and accurate repetitive positionings of pivoting or sliding components such as dividing plates, turrets, tables, carriages with which such machine tools as reamers, milling machines, lathes, tapering machines, etc. are equipped.

This invention may also be used for precisely positioning a part on the table or on the mandrel of a machine tool for the purpose of machining.

Other valuable applications may be achieved and studied for measuring and control instruments provided with sliding or pivoting elements requiring precise and repetitive positioning.

What is claimed is:

1. An indexing arrangement ensuring precise, rapid and repetitive positioning of two parts with respect to each other, the first one being capable of displacement by gliding upon the second, either in translation, or in rotation, or in combination of both, of a kind comprising a cylindrical cavity located in the second fixed part and perpendicular to the plane of sliding and terminating in it, one or more cylindrical cavities being located in the first movable part and of a diameter size as close as possible to that of the fixed part cavity, also perpendicular to the plane of sliding and ending on the latter there being a cylindrical pin provided with an insertion means for entry into one of the cylindrical cavities of the movable part when this cavity is approximately aligned with the cylindrical cavity of the fixed part into which this pin may slide with some play, in which the length of entry of the pin is limited to a predetermined value by a stop mounted on one of the parts, the pin comprising an expansible tubular envelope housing an elastic means radially dilating in both cavities of the fixed and movable parts under the influence of axial compression caused by the entry means when the length of entry is being stopped by the stop, this radial dilation taking place until there is interlocking of the fixed part of the envelope and the movable part.

2. An arrangement according to claim 1, characterized by said entry means being mounted on the fixed part and carrying the cylindrical pin, the expansible tubular envelope being provided with a flange resting upon a shoulder of the fixed part after the pin has entered a cavity of the movable part, said shoulder of the fixed part then providing a reacting surface to the compressive force of the entry means.

3. An indexing arrangement according to claim 1, characterized by the expansible tubular envelope being hermetic and holding a fluid which may be compressed by introduction of a plunging piston into said tubular envelope.

4. An indexing arrangement according to claim 3, characterized by the expansible tubular envelope being hermetic and holding a fluid which may be compressed by introduction of a plunging piston into said tubular envelope.

5. An indexing arrangement according to claim 3, characterized by the plunging piston being fixed at one end portion to the pin's entry means and being operative when the pin touches the stop, said piston carrying said envelope at its other end portion.

6. An indexing apparatus for relatively positioning first and second members which are slidably displaceable with respect to each other, comprising:

a first cylindrical cavity formed in said first member and extending substantially perpendicular to the surface thereof over which said second member is relatively slidably displaceable;

a second cylindrical cavity formed in said second member and extending substantially perpendicular to the surface thereof over which said first member is relatively slidably displaceable, said second cavity having substantially the same diameter as the diameter of said first cavity;

a cylindrical member comprising a radially elastically expandable tubular envelope;

insertion means for inserting said expandable envelope into said first and second cavities and positioning said envelope to bridge the interface of said cavities; and force exerting means exerting a radial force on said envelope in its bridging position to expand said envelope against the walls of said cavities and to thereby slidably displace said first and second members with respect to each other and to urge said cavities into axial alignment with each other, said force exerting means including a plurality of elastic washers contained in said envelope and means exerting an axial compressive force on said washers to cause said washers to exert a radial force on said envelope.

7. An indexing apparatus according to claim 6, wherein said cylindrical member further comprises a cylindrical pin to which said envelope is fixed, said insertion means being mounted on said first member and carrying said cylindrical pin, and wherein said expandable envelope is provided with a flange which rests on a shoulder of said first member upon insertion and positioning of said envelope in said cavities, said shoulder providing a surface against which the compressive force of said force exerting means acts.

* * * * *